(12) United States Patent
Lv et al.

(10) Patent No.: US 10,934,467 B2
(45) Date of Patent: Mar. 2, 2021

(54) FOAM FRACTURING FLUID WITH DOUBLE INTERFACE LAYERS OF A PHLOGISTICATED AIR-LIQUID CO2 FOR SHALE GAS PRODUCTION AND PREPARATION METHOD THEREOF

(71) Applicant: CHINA UNIVERSITY OF PETROLEUM—BEIJING, Beijing (CN)

(72) Inventors: Qichao Lv, Beijing (CN); Tongke Zhou, Beijing (CN); Rong Zheng, Beijing (CN); Zhaoxia Dong, Beijing (CN); Haimin Zheng, Beijing (CN); Juan Zhang, Beijing (CN); Meiqin Lin, Beijing (CN); Zihao Yang, Beijing (CN); Jingxue Wang, Beijing (CN)

(73) Assignee: CHINA UNIVERSITY OF PETROLEUM-BEIJING, Beijing (CN)

(*) Notice: Subject to any disclaimer, the term of this patent is extended or adjusted under 35 U.S.C. 154(b) by 0 days.

(21) Appl. No.: 16/735,553

(22) Filed: Jan. 6, 2020

(65) Prior Publication Data
US 2020/0224075 A1 Jul. 16, 2020

(30) Foreign Application Priority Data
Jan. 10, 2019 (CN) .......................... 201910022861.2

(51) Int. Cl.
*C09K 8/38* (2006.01)
*B01F 3/04* (2006.01)

(52) U.S. Cl.
CPC ............ *C09K 8/38* (2013.01); *B01F 3/04439* (2013.01); *B01F 3/04446* (2013.01); *C09K 2208/10* (2013.01)

(58) Field of Classification Search
CPC ... C09K 2208/10; C09K 8/38; B01F 3/04439; B01F 3/04446
See application file for complete search history.

(56) References Cited

U.S. PATENT DOCUMENTS 3,644,234 A * 2/1972 Grieve .................. C08G 18/34
521/113
2006/0069223 A1 3/2006 Lee et al.
(Continued)

FOREIGN PATENT DOCUMENTS

CN 107686724 A 2/2018
CN 108424759 A 8/2018
(Continued)

OTHER PUBLICATIONS

Li, Qiang et al, "Synthesis and performance evaluation of supercritical CO2 thickener for fracturing" Journal of Fault-Block Oil & Gas Field, vol. 25, No. 4, (Jul. 2018), English Abstract is included, pp. 541-544.
(Continued)

*Primary Examiner* — Frances Tischler
(74) *Attorney, Agent, or Firm* — J.C. Patents

(57) ABSTRACT

The disclosure discloses a foam fracturing fluid with double interface layers of a phlogisticated air-liquid $CO_2$ for shale gas development, and a preparation method thereof. The foam fracturing fluid is prepared from a liquid $CO_2$ phase, a gas phase and a nano-enhancer; the liquid $CO_2$ phase is formed by dissolving a mixture of gas-soluble foaming agents in liquid $CO_2$; the gas phase is a gas mixture of phlogisticated air and saturated vapor of the liquid $CO_2$; the nano-enhancer is an aqueous solution of a mixture of hydrophobic silica nanoparticles, a cosolvent and a water-soluble surfactant. In the fracturing fluid prepared by the present disclosure, the phlogisticated air was encapsulated by the liquid $CO_2$ to form an interface layer, the liquid $CO_2$
(Continued)

was further encapsulated by the nano-enhancer to form the other interface layer, which enhanced the structural stability of the fracturing fluid while achieving high viscosity and thermal stability.

11 Claims, 4 Drawing Sheets

(56) References Cited

U.S. PATENT DOCUMENTS

2016/0160116 A1* 6/2016 Al-Otaibi ............. E21B 43/166 507/202
2019/0300781 A1* 10/2019 Nguyen ................ C09K 8/703

FOREIGN PATENT DOCUMENTS

| CN | 108913116 A | 11/2018 | |
| WO | WO-2018017110 A1 * | 1/2018 | ............... C09K 8/82 |

OTHER PUBLICATIONS

Yu, Yi-Fan et al, "Experimental Study on Supercritical Carbon Dioxide Anhydrous Fracturing Thickener" Journal of Contemporary Chemical Industry, vol. 46, No. 6, (Jun. 2017), English Abstract is included, pp. 1146-.1148.

The first Office Action of the priority Chinese application No. 201910022861.2, dated Oct. 10, 2019.

The Chinese First Examination Report and Search Report of corresponding Chinese application No. 201910022861.2, dated Oct. 10, 2019.

* cited by examiner

FOAM FRACTURING FLUID WITH DOUBLE INTERFACE LAYERS OF A PHLOGISTICATED AIR-LIQUID CO2 FOR SHALE GAS PRODUCTION AND PREPARATION METHOD THEREOF

CROSS-REFERENCE TO RELATED APPLICATION

This application claims priority to Chinese Patent Application No. CN201910022861.2, filed on Jan. 10, 2019, entitled "A foam fracturing fluid with double interface layers of a phlogisticated air-liquid $CO_2$ for shale gas production and preparation method thereof", which is incorporated herein by reference in its entirety.

TECHNICAL FIELD

The disclosure relates to a foam fracturing fluid with double interface layers of a phlogisticated air-liquid $CO_2$ for shale gas production and a preparation method thereof, and belongs to the technical field of shale gas development engineering.

BACKGROUND

The shale gas resources are extremely abundant in the world, and play an increasingly important role in optimizing the energy structure and promoting economic development. However, shale gas reservoirs are hard to be developed due to the following points: the geological conditions of the reservoirs are generally poor and complex, the pores and throats are extremely small, permeability and porosity are ultra-low. The fracturing stimulation is a crucial method for efficient development of shale gas reservoirs.

At present, hydraulic fracturing is still the most widely used stimulation technology for shale reservoirs. However, water-based plant gum, cellulose, synthetic polymer and other reinforcers used in conventional fracturing fluids have the following problems: the polymer material that entered the shale reservoir is very easy to be adsorbed on the surface of the porous medium, which further reducing the original smaller volume of pore and throat. In addition, the polymer gel injected into the ground is difficult to be broken completely. And the gel residue not only damages the formation matrix, but also damages the proppant filling layers of the fracture, thereby affecting the connectivity of the fracture conducting channel. Swelling of clay was usually caused by the filtration of the water-based fracturing fluid into formation matrix, which will lead to un-ignored damage to water-sensitive reservoir. Moreover, the water-based fracturing fluid also has problems such as a lower flow-back rate, a long waiting time for gas production, and un-complete flow back, residual of liquid in the formation, which all will affect the fracturing stimulation of the reservoir.

In addition, in the fracturing operation of the shale gas, the problem of huge water consumption is also existed. The application of hydraulic fracturing in water shortage regions such as desert, Gobi, plateau and mountainous area is greatly restricted. The potential water pollution risk to the environment is hard to be avoided. Thus, it is necessary to provide a new type of foam fracturing fluid to solve these problems.

SUMMARY

The object of the present disclosure is to provide a foam fracturing fluid with double interface layers of a phlogisticated air-liquid $CO_2$ for shale gas production, which has the characteristics of low water consumption, ultra-low damage to formation, high foam stability and environment friendly.

The foam fracturing fluid with double interface layers of a phlogisticated air-liquid $CO_2$ for shale gas production provided by the disclosure is prepared from a liquid $CO_2$ phase, a gas phase and a nano-enhancer;

the liquid $CO_2$ phase is formed by dissolving a mixture of gas-soluble foaming agents in liquid $CO_2$;

the gas phase is a gas mixture of phlogisticated air and saturated vapor of the liquid $CO_2$;

the nano-enhancer is an aqueous solution of a mixture of hydrophobic silica nanoparticles, a cosolvent of particles and a water-soluble surfactant.

In the above foam fracturing fluid, the foam quality of the foam fracturing fluid may be 40% to 90%, specifically 56% to 65%, 56% or 65%;

the foam quality refers to the percentage of the gas phase volume of foam fracturing fluid to the total volume of foam fracturing fluid.

In the above foam fracturing fluid, the mixture of gas-soluble foaming agents comprising at least two of 2-trifluoromethane-3-methoxy decafluoropentane, 3-ethoxy tridecafluorohexane, fluorobutane ethyl ether, fluorobutane methyl ether and 1,1,2,2-tetrafluoro ethyl-2,2,3,3-tetrafluoro propyl ether;

Preferably, the mixture of gas-soluble foaming agents is consisted by fluorobutane ethyl ether and 3-ethoxy tridecafluorohexane with a mass ratio of 2 to 5:1, such as 4.5:1, or consisted by fluorobutane ethyl ether and 2-trifluoromethane-3-methoxy decafluoropentane with a volume ratio of 3 to 7:1, such as 3.3:1. The mixture of gas-soluble foaming agents with the above composition can be dissolved in liquid $CO_2$ and exhibits good interfacial activity, thereby the purpose of stabilizing the gas phase/liquid $CO_2$ phase interface and the liquid $CO_2$ phase/nano-enhancer interface in the fracturing fluid system can be achieved.

In the liquid $CO_2$ phase, an initial volume concentration of the mixture of gas-soluble foaming agents (i.e., the volume concentration of the mixture of gas-soluble foaming agents when the foam fracturing fluid is initially formed) is 0.2% to 2.0%, such as 0.5% to 0.6%, 0.5% or 0.6% by volume.

In the above phlogisticated air, the content of oxygen is such as 4% by volume;

the phlogisticated air can be prepared by injecting the air into a membrane separator to increase the nitrogen content, and then subjected to a gas booster for compression;

alternatively, mixing the air after being subjected to membrane separation and compression with industrial nitrogen having a purity higher than 99.5% so as to further reduce the oxygen content in the phlogisticated air to less than 3%, thereby ensuring safety of fracturing operation and improving the pressure of the prepared phlogisticated air;

In the above gas phase of foam fracturing fluid, a gas partial pressure of the phlogisticated air is at least one time (such as 1.3 to 1.5 times, 1.3 times or 1.5 times) as that of the saturated vapor of liquid $CO_2$.

In the above foam fracturing fluid, the nano-enhancer is composed by the hydrophobic silica nanoparticles with the concentration of 0.4%~2.0% by weight, the cosolvent with the concentration of 0.1%~0.5% by weight, the water-soluble surfactant with the concentration of 0.1%~0.6% by weight, and the balance of water;

Specifically, the nano-enhancer can be any one of the following 1)-3):

1) a nano-enhancer that composed by the hydrophobic silica nanoparticles with the concentration of 1%-1.5% by weight, the cosolvent with the concentration of 0.2%-0.25% by weight, the water-soluble surfactant with the concentration of 0.4%-0.5% by weight, and the balance of water;

2) a nano-enhancer that composed by the hydrophobic silica nanoparticles with the concentration of 1% by weight, the cosolvent with the concentration of 0.2% by weight, the water-soluble surfactant with the concentration of 0.4% by weight, and the balance of water;

3) a nano-enhancer that composed by the hydrophobic silica nanoparticles with the concentration of 1.5% by weight, the cosolvent with the concentration of 0.25% by weight, the water-soluble surfactant with the concentration of 0.5% by weight, and the balance of water.

In the above foam fracturing fluid, the hydrophobic silica nanoparticles are modified by silanol groups, and a density of the silanol groups on the surface of silica nanoparticles is 0.3 to 0.5/nm$^2$, a wetting angle of the hydrophobic silica nanoparticles to distilled water is 107°~125°, a particle size of the hydrophobic silica nanoparticles is 10~40 nm;

the cosolvent is ethanol, ethylene glycol or isopropanol;

the water-soluble surfactant is a mixture of sodium bis (2-ethylhexyl) sulfosuccinate and sodium α-sulfofatty acid methyl ester with a mass ratio of 4~7:1, such as 5:1;

in the above foam fracturing fluid, the content of the nano-enhancer is ≤9% by volume, such as 5%-6%, 5% or 6% by volume.

The present disclosure further provides a preparation method of the foam fracturing fluid, including the following steps:

1) preparing the aqueous solution of a mixture of hydrophobic silica nanoparticles, a cosolvent of particles and a water-soluble surfactant so as to obtain the nano-enhancer;

2) injecting the nano-enhancer into a high-pressure agitated autoclave, and then injecting the phlogisticated air to a predetermined pressure;

3) while $CO_2$ gas is injected into the high-pressure agitated autoclave by a booster pump, injecting the mixture of gas-soluble foaming agents, after stirring, the foam fracturing fluid is obtained.

In the above preparation method, in the step 1), it is preferred that an aqueous solution of the water-soluble surfactant was firstly prepared, then the hydrophobic silica nanoparticles and the cosolvent were added into the aqueous solution, and after stirring, the nano-enhancer was obtained.

In the above preparation method, in the step 2), the predetermined pressure is 7~50 MPa;

the Waring Blender method was utilized for stirring, and the stirring was performed for 3 to 8 minutes at a speed of 3000 to 5000 rpm.

In the above preparation method, in the step 3), the $CO_2$ gas is pressurized by the booster pump, and the $CO_2$ gas is pressurized and liquefied below the critical temperature (31.26° C.) and the critical pressure (7.38 MPa) of $CO_2$.

The "double interface layers" of the foam fracturing fluid refers to an interface layer formed by encapsulating the phlogisticated air with the liquid $CO_2$ and the other interface layer formed by encapsulating the liquid $CO_2$ with the nano-enhancer.

The present disclosure has the following beneficial effects:

(1) In the foam fracturing fluid system prepared by the present disclosure, the phlogisticated air was encapsulated by the liquid $CO_2$ to form an interface layer, the liquid $CO_2$ was further encapsulated by the nano-enhancer to form the other interface layer, which enhanced the structural stability of the fracturing fluid while achieving high viscosity and thermal stability.

(2) The water content in the fracturing fluid system prepared by the present disclosure was extremely low, which reduces the damage in the fracturing process caused by the intrusion of water phase to the shale gas production layer. In addition, the invaded water phase in the formation layer can be brought out of the crack and matrix by the rapid expansion of the liquid $CO_2$ and the phlogisticated air in the foam fracturing during flow-back operation. Thus, the waiting time of water production can be reduced significantly and the shale gas reservoirs can be protected efficiently. Thereby the production of shale gas can be rapidly increased.

(3) The water consumption of the foam fracturing fluid prepared by the present disclosure was low, and air can be easily obtained and prepared into the phlogisticated air in the fracturing fluid system. Thereby the cost of fracturing operation can be reduced and the fracturing application of shale gas reservoirs in water-deficient area regions such as desert, Gobi, plateau and mountain areas can be easier.

(4) The present disclosure provides a novel fracturing fluid utilizing carbon dioxide for the efficient development of shale reservoirs. The performance of the novel fracturing fluid is substantially improved compared to that of the conventional pure liquid $CO_2$ fracturing fluid. The present disclosure provides a new idea for the efficient use of greenhouse gases.

DETAILED DESCRIPTION OF THE EMBODIMENTS

Figure 1:
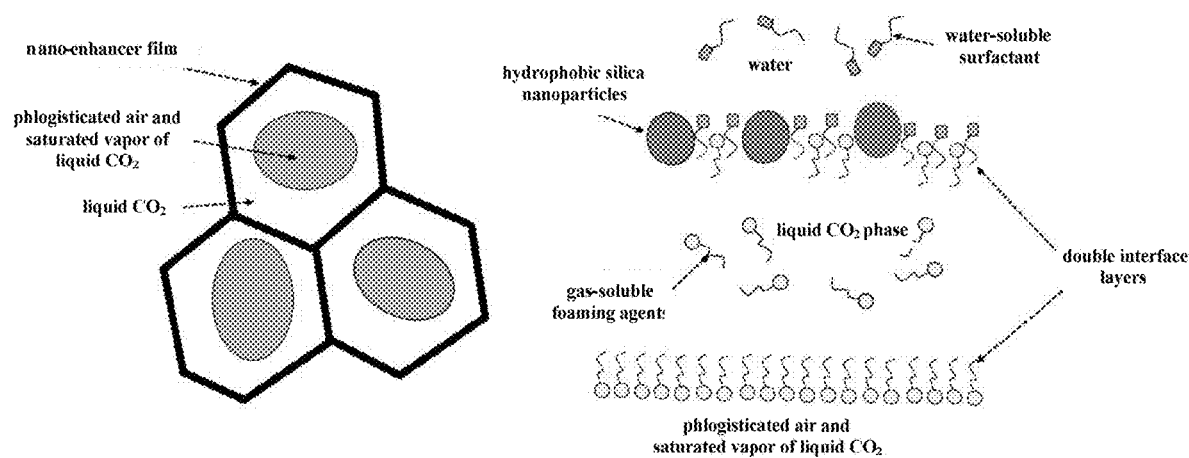
FIG. 1 is a schematic diagram of the microstructure and formation mechanism of the foam fracturing fluid with double interface layers of a phlogisticated air-liquid $CO_2$.

The experimental methods used in the following embodiments are conventional methods unless otherwise specified.

The materials, reagents and the like used in the following embodiments are commercially available unless otherwise specified.

Embodiment 1 A Foam Fracturing Fluid with Double Interface Layers of a Phlogisticated Air-Liquid $CO_2$ for Shale Gas Production The foam fracturing fluid is prepared from a liquid $CO_2$ phase, a gas phase, a nano-enhancer, wherein:

the liquid $CO_2$ phase is formed by dissolving a mixture of gas-soluble foaming agents in liquid $CO_2$, the initial volume concentration of the gas-soluble foaming agents in liquid $CO_2$ is 0.5% by volume, and the mixture of gas-soluble foaming agents comprising 2-trifluoromethane-3-methoxy-decafluoropentane and fluorobutane ethyl ether with a mass ratio of 1:3.3.

The gas phase is composed of phlogisticated air and saturated vapor of the liquid $CO_2$, the content of oxygen in the phlogisticated air is 4% by volume, and the gas partial pressure of the phlogisticated air is 1.3 times as that of the saturated vapor of the liquid $CO_2$.

The nano-enhancer is composed by the hydrophobic silica nanoparticles with the concentration of 1.0% by weight, the ethanol with the concentration of 0.2% by weight, the water-soluble surfactant with the concentration of 0.4% by weight, and the balance of water. The density of the silanol groups on the surface of the hydrophobic silica nanoparticles is $0.4/nm^2$. A wetting angle of the hydrophobic silica nanoparticles to distilled water is 122°. A particle size of the hydrophobic silica nanoparticles is 18 nm. The water-soluble surfactant is a mixture of sodium bis(2-ethylhexyl) sulfosuccinate and sodium α-sulfofatty acid methyl ester with a mass ratio of 5:1.

The foam fracturing fluid with double interface layers of a phlogisticated air-liquid $CO_2$ is prepared as follows:

step 1. dissolving the water-soluble surfactant in water, after adequately stirring, a solution of the water-soluble surfactant was obtained;

step 2. the hydrophobic silica nanoparticles and the cosolvent are uniformly mixed and added into the solution of the water-soluble surfactant, and after adequately stirring, a nano-enhancer was obtained;

step 3. after injecting 60 mL of the nano-enhancer into a high-pressure agitated autoclave with a volume of 1000 mL, injecting the phlogisticated air into the autoclave until the pressure is reached to 8.6 MPa;

step 4. injecting the $CO_2$ gas into the high-pressure agitated autoclave through a booster pump (the $CO_2$ gas was pressurized and liquefied below the critical temperature (31.26° C.) and the critical pressure (7.38 MPa) by the booster pump), and gradually increasing the $CO_2$ injection amount until the total volume of liquid $CO_2$ and the nano-enhancer in the high-pressure agitated autoclave is reached to about 460 mL, and then injecting 2 mL of the mixture of gas-soluble foaming agents into the high-pressure agitated autoclave;

step 5. the Waring Blender method was utilized for stirring the liquid $CO_2$ and the nano-enhancer in the high-pressure agitated autoclave, and the stirring was performed for 5 minutes at a stirring speed of 4000 rpm, and the foam fracturing fluid with double interface layers of a phlogisticated air-liquid $CO_2$ was obtained.

The schematic diagram of the microstructure and formation mechanism of the foam fracturing fluid with double interface layers of a phlogisticated air-liquid $CO_2$ are shown in FIG. 1. It can be seen that the foam fracturing fluid with double interface layers of a phlogisticated air-liquid $CO_2$ of the present disclosure has a structure that consisted of the following three parts: a liquid $CO_2$ phase, a gas phase (gas mixture of phlogisticated air and saturated vapor of the liquid $CO_2$) and a nano-enhancer. The double interface layers refers to an interface layer formed by encapsulating the phlogisticated air with the liquid $CO_2$ and the other interface layer formed by encapsulating the liquid $CO_2$ with the nano-enhancer. The gas-soluble foaming agents can be dissolved in the liquid $CO_2$ and exhibit good interfacial activity, thereby the gas phase/liquid $CO_2$ phase interface in the foam fracturing fluid can be stabilized. At the same time, the gas-soluble foaming agents in combination with the hydrophobic silica nanoparticles and the water-soluble surfactant can stabilize the interface of liquid $CO_2$ phase/nano-enhancer.

Figure 2:
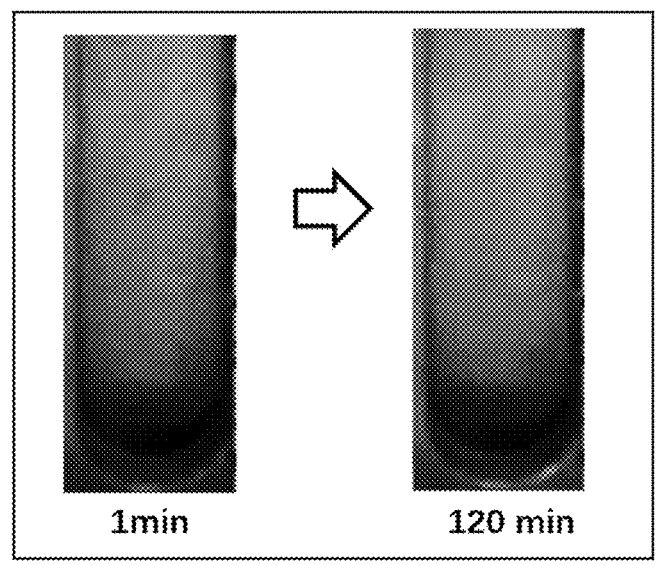
FIG. 2 is a photograph of the foam fracturing fluid with double interface layers of a phlogisticated air-liquid $CO_2$ prepared in Embodiment 1.
Figure 3:
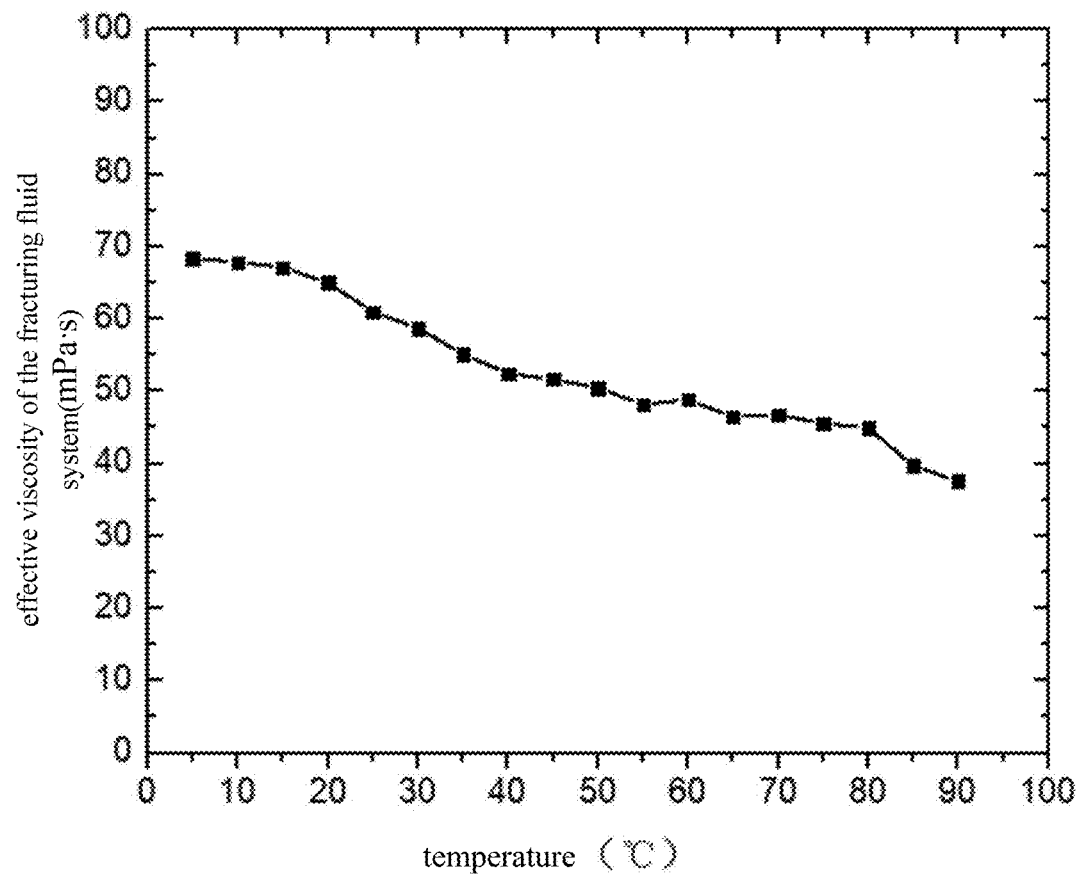
FIG. 3 is a viscosity-temperature curve of the foam fracturing fluid with double interface layers of a phlogisticated air-liquid $CO_2$ prepared in Embodiment 1.

A photograph of the foam fracturing fluid with double interface layers of a phlogisticated air-liquid $CO_2$ prepared in this embodiment is shown in FIG. 2. The foam quality of the foam fracturing fluid is about 56%. The content of the nano-enhancer in the foam fracturing fluid is 6% by volume, and the content of water is only 6% by volume, which means that the water consumption of the fracturing fluid system is low. The foam fracturing fluid is dense and uniform after being formed for 1 min. There is no obvious change of the foam fracturing fluid after standing for 120 min, indicating the stability of foam is high. The viscosity-temperature curve of the foam fracturing fluid was tested by a tube viscometer at a temperature of 5° C.~90° C. The shear rate during the test was 170 $s^{-1}$. The experimental results shown in FIG. 3 indicated the fracturing fluid system has good viscosity-temperature stability, which is due to the viscosity-increasing effect provided by the structure of the double interface layers formed in the foam fracturing fluid of the present disclosure. The viscosity of the fracturing fluid system at a temperature of 5° C.~90° C. is 37~68 mPa·s, which is much higher than that of the traditional fracturing fluid that using pure liquid $CO_2$ (that is, using pure liquid $CO_2$ as a fracturing fluid) (generally 0.02~0.16 mPa·s).

Embodiment 2: A Foam Fracturing Fluid with Double Interface Layers of a Phlogisticated Air-Liquid $CO_2$ for Shale Gas Production The foam fracturing fluid is prepared from a liquid $CO_2$ phase, a gas phase, a nano-enhancer, wherein:

the liquid $CO_2$ phase is formed by dissolving a mixture of gas-soluble foaming agents in liquid $CO_2$, the initial volume concentration of the gas-soluble foaming agents in liquid $CO_2$ is 0.6% by volume, and the mixture of gas-soluble foaming agents comprising 3-ethoxytridecafluorohexane and fluorobutane ethyl ether with a mass ratio of 1:4.5.

The gas phase is composed of phlogisticated air and saturated vapor of the liquid $CO_2$, the content of oxygen in the phlogisticated air is 4% by volume, and the gas partial pressure of the phlogisticated air is 1.5 times as that of the saturated vapor of the liquid $CO_2$.

The nano-enhancer is composed by the hydrophobic silica nanoparticles with the concentration of 1.5% by weight, the ethanol with the concentration of 0.25% by weight, the water-soluble surfactant with the concentration of 0.5% by weight, and the balance of water. The density of the silanol groups on the surface of the hydrophobic silica nanoparticles is $0.4/nm^2$, a wetting angle of the hydrophobic silica nanoparticles to distilled water is 122°, a particle size of the hydrophobic silica nanoparticles is 18 nm; and the water-soluble surfactant is a mixture of sodium bis(2-ethylhexyl) sulfosuccinate and sodium α-sulfofatty acid methyl ester with a mass ratio of 5:1.

The foam fracturing fluid with double interface layers of a phlogisticated air-liquid $CO_2$ is prepared as follows:

step 1. dissolving the water-soluble surfactant in water, after adequately stirring, a solution of the water-soluble surfactant was obtained;

step 2. the hydrophobic silica nanoparticles and the cosolvent are uniformly mixed and added into the solution of the water-soluble surfactant, and after adequately stirring, a nano-enhancer was obtained;

step 3. after injecting 50 mL of the nano-enhancer into a high-pressure agitated autoclave with a volume of 1000 mL at a temperature of 5° C., injecting the phlogisticated air into the autoclave until the pressure is reached to 9.7 MPa;

step 4. injecting the $CO_2$ gas into the high-pressure agitated autoclave through a booster pump, and gradually increasing the $CO_2$ injection amount until the total volume of liquid $CO_2$ and the nano-enhancer in the high-pressure agitated autoclave is reached to about 350 mL, and then injecting 2 mL of the mixture of gas-soluble foaming agents into the high-pressure agitated autoclave;

step 5. the Waring Blender method was utilized for stirring the liquid $CO_2$ and the nano-enhancer in the high-pressure agitated autoclave, and the stirring was performed for 4 minutes at a stirring speed of 5000 rpm, and the foam fracturing fluid with double interface layers of a phlogisticated air-liquid $CO_2$ was obtained.

Figure 4:
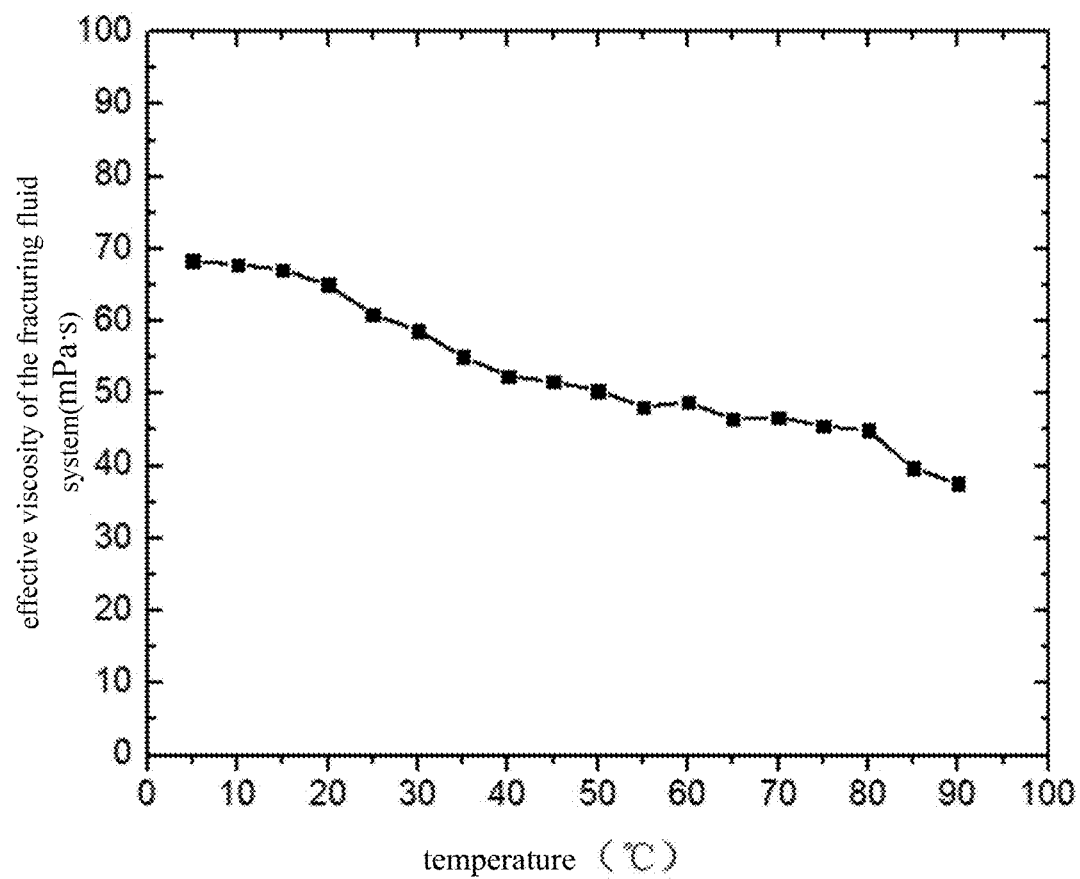
FIG. 4 is a viscosity-temperature curve of the foam fracturing fluid with double interface layers of a phlogisticated air-liquid $CO_2$ prepared in Embodiment 2.

In the foam fracturing fluid with double interface layers of a phlogisticated air-liquid $CO_2$ prepared in this embodiment, the foam quality of the foam fracturing fluid is about 65%, the content of the nano-enhancer is 5% by volume. The foam fracturing fluid is dense and uniform, and there is no obvious change of the foam fracturing fluid after standing for 120 minutes, good stability can be maintained. The content of water in the foam fracturing fluid is only 5% by volume, which means that the water consumption of the fracturing fluid system is low. The viscosity-temperature curve of the foam fracturing fluid was tested by a tube viscometer at a temperature of 5° C.~90° C., the shear rate during the test was 170 s$^{-1}$. The experimental results shown in FIG. 4 indicated the fracturing fluid system has good viscosity-temperature stability, which is due to good viscosity-increasing effect provided by the structure of the double interface layers formed in the foam fracturing fluid of the present disclosure. The viscosity of the fracturing fluid system at a temperature of 5° C.~90° C. is 42~72 mPa~s, which is much higher than that of the traditional fracturing fluid that using pure liquid $CO_2$ (that is, using pure liquid $CO_2$ as a fracturing fluid) (generally 0.02~0.16 mPa·s).

What is claimed is:

1. A foam fracturing fluid with double interface layers of a phlogisticated air-liquid $CO_2$, wherein, the foam fracturing fluid is prepared from a liquid $CO_2$ phase, a gas phase and a nano-enhancer; wherein, the phlogisticated air is air with a content of oxygen being ≤5% by volume; the double interface layers of the foam fracturing fluid refers to an interface layer formed by encapsulating the phlogisticated air with the liquid $CO_2$ and the other interface layer formed by encapsulating the liquid $CO_2$ with the nano-enhancer;
   the liquid $CO_2$ phase is formed by dissolving a mixture of gas-soluble foaming agents in liquid $CO_2$;
   the mixture of gas-soluble foaming agents is a mixture comprising at least two of 2-trifluoromethane-3-methoxydecafluoropentane, 3-ethoxytridecafluorohexane, fluorobutane ethyl ether, fluorobutane methyl ether and 1,1,2,2-tetrafluoroethyl-2,2,3,3-tetrafluoropropyl ether;
   an initial volume concentration of the mixture of gas-soluble foaming agents in the liquid $CO_2$ phase is 0.2% to 2.0% by volume;
   the gas phase is a gas mixture of phlogisticated air and saturated vapor of the liquid $CO_2$;
   the nano-enhancer is an aqueous solution of hydrophobic silica nanoparticles, a cosolvent and a mixture of water-soluble surfactants; wherein, the cosolvent is a solvent that solubilizes the hydrophobic silica nanoparticles;
   the hydrophobic silica nanoparticles are modified by silanol groups, and a density of the silanol groups is 0.3 to 0.5/nm$^2$, a wetting angle of the hydrophobic silica nanoparticles to distilled water is 107° C.~125° C., a particle size of the hydrophobic silica nanoparticles is 10~40 nm;
   the cosolvent is ethanol, ethylene glycol or isopropanol;
   the mixture of water-soluble surfactants is a mixture of sodium bis(2-ethylhexyl) sulfosuccinate and sodium α-sulfofatty acid methyl ester.

2. The foam fracturing fluid according to claim 1, wherein foam quality of the foam fracturing fluid is 40% to 90%; wherein, the foam quality refers to a percentage of a volume of the gas phase of the foam fracturing fluid to a total volume of the foam fracturing fluid.

3. The foam fracturing fluid according to claim 1, wherein in the gas phase, a gas partial pressure of the phlogisticated air is at least one time as that of the saturated vapor of liquid $CO_2$.

4. The foam fracturing fluid according to claim 1, wherein the nano-enhancer is composed by the hydrophobic silica nanoparticles with a concentration of 0.4%~2.0% by weight, the cosolvent with a concentration of 0.1%~0.5% by weight, the mixture of water-soluble surfactants with a concentration of 0.1%~0.6% by weight, and the balance of water.

5. The foam fracturing fluid according to claim 3, wherein the nano-enhancer is composed by the hydrophobic silica nanoparticles with a concentration of 0.4%~2.0% by weight, the cosolvent with a concentration of 0.1%~0.5% by weight, the mixture of water-soluble surfactants with a concentration of 0.1%~0.6% by weight, and the balance of water.

6. The foam fracturing fluid according to claim 1, wherein in the foam fracturing fluid, the content of the nano-enhancer is ≤9% by volume.

7. The foam fracturing fluid according to claim 3, wherein in the foam fracturing fluid, the content of the nano-enhancer is ≤9% by volume.

8. The foam fracturing fluid according to claim 4, wherein in the foam fracturing fluid, the content of the nano-enhancer is ≤9% by volume.

9. The foam fracturing fluid according to claim 5, wherein in the foam fracturing fluid, the content of the nano-enhancer is ≤9% by volume.

10. A preparation method of the foam fracturing fluid according to claim 1, comprising the following steps:
    1) preparing the aqueous solution of the hydrophobic silica nanoparticles, the cosolvent and the mixture of water-soluble surfactants so as to obtain the nano-enhancer;
    2) injecting the nano-enhancer into a high-pressure agitated autoclave, and then injecting the phlogisticated air to a predetermined pressure;
    3) while $CO_2$ gas is injected into the high-pressure agitated autoclave by a booster pump, injecting the mixture of gas-soluble foaming agents, after stirring, the foam fracturing fluid is obtained.

11. The preparation method according to claim 10, wherein the predetermined pressure is 7~50 MPa;
    wherein a Waring Blender method is utilized for stirring, and the stirring is performed for 3 to 8 minutes at a speed of 3000 to 5000 rpm.

* * * * *